Feb. 14, 1967     R. M. ANDERSON     3,303,674

FLASH LAMP

Filed April 30, 1965

Inventor:
Robert M. Anderson
by Richard H. Burgess
His Attorney

United States Patent Office 3,303,674
Patented Feb. 14, 1967

3,303,674
FLASH LAMP
Robert M. Anderson, Euclid, Ohio, assignor to General
Electric Company, a corporation of New York
Filed Apr. 30, 1965, Ser. No. 452,189
6 Claims. (Cl. 67—31)

This invention relates in general to flash lamps of the type comprising a sealed radiation-transmitting bulb containing combustible material and a combustion-supporting medium, such as an oxygenous gas, which enters into a reaction with the combustible material with the resulting emission of an instantaneous flash of actinic light of high intensity. Furthermore, this invention is to some extent based upon, and an improvement on, the invention described and claimed in Patent 2,982,119, Anderson, assigned to the same assignee as the present application. More particularly, this invention relates to a midget sized flash lamp having a filling of combustible material in a form that can be adapted to produce a light output suitable for use with cameras having focal-plane shutters.

Miniature photoflash lamps made from glass tubing include the type commercially known as the AG–1. Such lamps have previously been adapted for use with regular, between-the-lens shutter cameras, but not specifically designed for use with focal-plane cameras.

In a focal-plane camera, the shutter is located between the lens structure and the film, at or near the focal plane of the lens. This permits the entire lens structure to be removed from the camera in order to substitute a different lens, such as a telescopic lens or a wide-angle lens. Non-focal-plane cameras have the shutter between two sections of the lens, so that only the outer section of the lens is removed when a different lens structure is to be substituted. Since interchangeable lenses for focal-plane cameras need not take into account the characteristics of a part of a lens remaining on the camera, it is generally possible to obtain a more precise and a more adaptable interchangeable lens for focal-plane cameras than for between-the-lens shutter cameras. However, the shutter in the usual type of focal-plane camera sweeps across the light image being projected onto the film inside the camera from one side to the other rather than opening and closing more or less uniformly for the entire image. Thus, for use with a camera having a focal-plane shutter, a photoflash lamp must have a light output substantially constant during the entire time that the shutter is sweeping across the image to avoid exposure differences from one side of the film to the other.

Although the light output parameters of photoflash lamps of the same general type as the AG–1 can be altered by various techniques, the types of changes that can be made by known techniques are limited. For instance, focal-plane AG–1 type photoflash lamps previously have not been commercially available.

Among techniques that can be used to vary the light output of such photoflash lamps are: chemically varying the combustible material, or at least its surfaces; varying the physical structure of the combustible material; and altering the combustion-supporting gaseous atmosphere in the lamp. A modification of the shape of filamentary combustible filling material in a flash lamp that has a considerable effect on the light output of the lamps and their cost and commercial acceptability is the use of shredded foil such as that described and claimed in Patent 2,351,290, Rippl et al., assigned to the assignee of the present invention, rather than circular cross-section wire. Such shredded foil has a width comparable to its thickness. The teachings of that patent allow the production of fine metallic strands having burrs which serve to kindle combustion, rendering the strands more easily ignitable. Prior to the use of strands with burrs, known as shredded foil, only certain alloys such as of aluminum and magnesium were used as photoflash lamp combustible materials. These alloys, in turn, could be used as round, drawn filaments in contrast to unalloyed aluminum which still earlier had been used in the form of beaten leaf foil.

The beaten foil was made by techniques normally used to produce beaten gold leaf such as hammering very thin sheets of metal between layers of calfskin to thicknesses on the order of 0.000010 to 0.000015 inch. Such uses of beaten aluminum foil in photoflash lamps are described in reissued Patent Re. 18,678, Ostermeier, Patent 2,136,-234, Cartun and Patent 2,142,372, Pipkin et al., all assigned to the assignee of the present invention. Beaten foil is very expensive as compared with rolled or rolled and shredded foil. However, commercial rolling techniques are not suitable for producing metal foil of such small thicknesses. The main reason for using beaten foil as in photoflash lamps was that its extreme thinness was necessary to obtain ignition.

Also, prior art foil flash lamps experienced difficulties from the cooling effect of contact of the metal foil with the glass bulb wall which resulted in quenching of at least some of the combustion, thereby diminishing and causing variations in light output, as taught by Pipkin et al. in Patent 2,142,372. When combustible wire alloys and subsequently shredded foil became available, foil flash lamps soon disappeared from the commercial markets. Flash lamp designs have been made using sheets of foil suspended away from the bulb walls as in Patent 2,057,583, Mey, assigned to the assignee of the present invention, and Patent 2,955,447, Fink, but these designs are not satisfactory for high production type modern miniature flash lamps.

It is an object of the present invention to provide a photoflash lamp construction in which the combustible material comprises sheet foil having a thickness great enough that it can have been produced by rolling rather than beating and so that it can possess the desired resiliency and having dimensions, especially in the plane of the foil, great enough to allow it to be supported resiliently by contact with the bulb walls.

A further object is to provide such a photoflash lamp, the light output characteristics of which are adaptable to changes by different specifications for the thickness, size and configuration of the sheet foil filling.

Another object of the invention is to provide such a photoflash lamp in which the sheet foil serves the additional purpose of preventing filamentary combustible material that also may be present in the lamp from becoming embedded in the exhaust tip of the lamp during the sealing operation.

Still another object of the present invention is to provide a design for photoflash lamps that is capable of being adapted to use either sheet foil combustible material alone or sheet foil in combination with filamentary combustible material to permit the production of different photoflash lamps having greatly varied light output characteristics.

Also included as an object is the provision of focal-plane photoflash lamps made from glass tubing and having a stem press seal at one end and a tipped closure at the other end. This object is especially directed toward the production of focal-plane flash lamps of a miniature size, preferably less than 2 cubic centimeters (cc.) in internal volume, similar in size, shape and total light output to the photoflash lamp now commercially known as the AG–1.

Further objects and advantages of the invention will appear from the following detailed description of species thereof and from the accompanying drawing.

Figure 1:
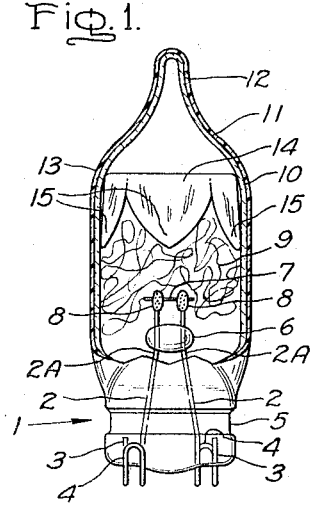
FIGS. 1, 2 and 3 are front elevational views partly in section of three different lamp constructions exemplary of the invention.

In accordance with the invention, I have discovered that modern miniature photoflash lamps can be made commercially and reproducibly using sheet foil combustible material which can have a substantial amount of contact with the bulb wall, provided certain limitations are met. The sheet foil combustible material must be more readily combustible than aluminum or magnesium. Zirconium sheet foil together with a combustion-supporting gas such as oxygen at a pressure substantially above one atmosphere have given particularly good results. Other combustible materials such as thorium or hafnium may be used. The use of thorium as combustible material in photoflash lamps is disclosed and claimed in application Serial No. 161,803, Johnson, filed December 26, 1961, now Patent No. 3,191,406, issued June 29, 1965, and assigned to the assignee of the present invention.

Briefly stated, the present invention provides in one embodiment a photoflash lamp produced from tubular glass sealed at each end and containing as at least part of its combustible material sheet foil consisting essentially of zirconium. The term "sheet foil" is here used to mean foil having a thickness great enough to give the desired resiliency and small enough that it is combustible. Such foil is not produced by hammering and generally is produced by rolling, and it generally has a thickness greater than about 0.0001 inch. The lamp includes ignition means and may have a stem press seal at one end with the other end being narrowed and closed by tipping. Photoflash lamps of the invention also have a filling of a combustion-supporting gas at a pressure of at least several atmospheres such as five atmospheres, and generate a total light output per unit bulb volume of at least about 3,000 lumen seconds per cubic centimeter (cc.). The sheet foil material resiliently presses against the inner surface of the lamp wall thereby tending to keep the sheet foil in position within the lamp. In particular embodiments of the invention, the combustible material may be in part filamentary or other types of material in addition to the foil used. In one specific form, the sheet foil material is deformed or folded into the shape of a cup or thimble which has its open end facing the ignition means. The sides of the cup make resilient contact with areas of the inner surface of the lamp wall. The sheet foil filling can be of such a configuration and size that it surrounds a part or all of any filamentary combustible material present in the lamp, and it may partly or completely surround the ignition means in the lamp, either in the presence of or in the absence of filamentary combustible material added to the lamp. One specific embodiment of the invention is a focal-plane photoflash lamp with a volume of about 1.2 cc. and containing a piece of zirconium foil having a thickness of about 0.0008 inch and being about a five-eighth-inch square folded into the shape of an earred cup or thimble. This photoflash lamp contains about 30–35, preferably 32.5, milligrams (mg.) zirconium sheet foil and about 6–7, preferably 6.5, mg. shredded zirconium foil. The foil shreds may have cross sections in the neighborhood of 0.0005 to 0.003 square inch.

It was generally assumed in the prior art that sheet foil could not be ignited satisfactorily in photoflash lamps if the thickness was greater than a very small dimension. This dimensional limitation required that the foil be produced by beating rather than by rolling, thus adding greatly to its cost. In addition, such foil was difficult to produce, handle, and utilize in the mass production of lamps. It also had disadvantages in use, especially in variability of light output, due in part to the quenching of combustion by contact of foil with the inner surfaces of the glass wall of the photoflash lamp as taught by Ostermeier Re. 18,678 with emphasis on a loose filling of leaf foil. These and other well-known disadvantages lead to the virtual disappearance of foil photoflash lamps from the market with the advent of flashable filamentary alloys and shredded foil.

Contrary to these teachings of the technical prior art that were confirmed at the market place, I have discovered that certain types of foil material not only can be used effectively and efficiently in commercial photoflash lamps but also provide a versatility in both light production and possibilities of cost saving that are very useful and that allow the production of different types of photoflash lamps than those previously known, e.g., all-glass type focal-plane miniature photoflash lamps.

Turning now to the drawing, FIG. 1 illustrates one construction of a photoflash lamp of the invention. Aside from the use of sheet foil material, the flash lamp illustrated is generally of a type described in detail in Patent 2,982,119, Anderson, which is hereby incorporated herein by reference. Therefore, the description of the basic lamp construction need not be repeated here in as much detail as in that patent. In general terms, the lamp comprises a stem press base 1, having electrical leads sealed therein, the external portions of which are retroverted and sealed back into the stem press as at 3 and folded back over opposite sides of the stem press at 4 to provide electrical contacts. The stem press base generally has a continuous slot 5 at one side to facilitate handling and utilization of the lamps. This base structure is described in further detail in Patent 3,016,727, Vanden Boom et al., assigned to the assignee of the present invention. The inner portions 2A of the lead wires 2 are held in position by a glass bead 6 and are electrically connected near their innermost ends by a filament such as of tungsten or tungsten-rhenium alloy wire. On the lead wires and the filament is located a fulminating primer material 8 which supplies ignition means to initiate the flash of the lamp on the input of an electrical current through filament 7. Filament 7 heats very rapidly causing the fulminating primer to ignite. This ignition in turn causes the rapid combustion of filamentary combustible materials within the photoflash lamp, causing ignition of sheet foil 14. The wall of the lamp is formed from glass tubing 10, the base 1 having been formed at one end of the tubing. The other end of the tubing is narrowed down at 11 to allow closure by formation of tip 12 after the rest of the assembly of the inner parts of the lamp. After tipping, the photoflash lamp can be covered with a protective lacquer 13 as a safety feature to prevent explosion on flashing the lamp. In this particular embodiment, a cup or thimble of zirconium sheet foil 14 has been formed and positioned over the filamentary material 9, between the filamentary material 9 and the tip 12. The open end of the cup faces the ignition means which comprises the filament and the fulminating primer. In this instance, the cup has a number of ears 15 that have been folded from the sheet foil material in production of the cup. These ears contact the inner surface of the glass bulb wall giving some resilient support to the foil and tending to hold it in position. If the foil cup were pressed from round rather than square foil blanks, the ears might be replaced by irregular corrugations.

Figure 2:
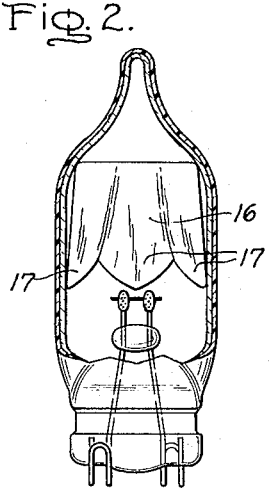

FIG. 2 illustrates another embodiment of the invention in which a larger piece of sheet foil 16 has been folded into the shape of a cup and inserted in the flash lamp with its open end facing the ignition means. The lamp of FIG. 2 does not contain filamentary combustible material 12 for light production, but the sheet foil provides all the combustible material. The foil cup 16 in this lamp also has ears 17 which resiliently support the foil against the inner surface of the bulb wall.

Figure 3:
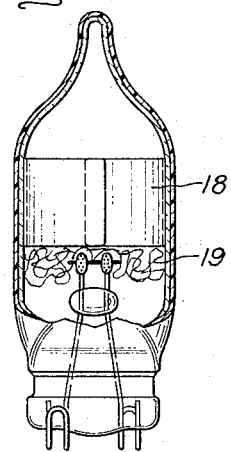

FIG. 3 shows a still different embodiment of the invention in an all-glass type of photoflash lamp. The sheet foil in this embodiment is provided as a cylindrical band 18. The tendency of the band to unwind gives it some resilient support against the bulb wall tending to hold it in place. Such a lamp can be provided either with or without filamentary filling material. Filamentary combustible material 19 is shown in this lamp.

Figure 4:
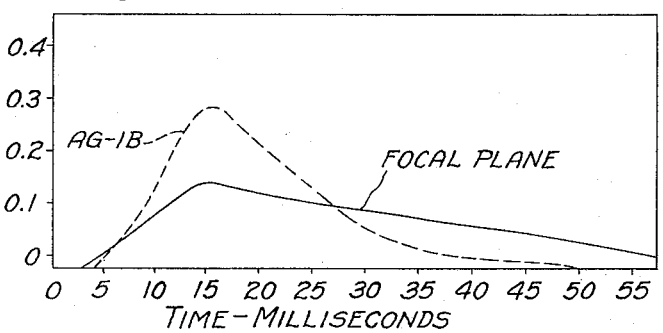
FIG. 4 is a graphical representation of the light output of a photoflash lamp of the prior art as compared with a photoflash lamp of the present invention.

FIG. 4 is a graphical representation of the light output intensity in megalumens (millions of lumens) with respect to time in milliseconds (ms.) of two types of photoflash lamps. The more sharply peaked curve represents the light output of a commercial AG-1B bulb. This is a normal AG-1 lamp with a blue coating for color correction to better suit the lamps for use with certain color photographic films. The light output of a focal-plane lamp of the invention having the same general configuration as the AG-1B and including the blue coating is also shown. This focal-plane lamp had a filling of about 6.5 mg. of shredded zirconium foil, 0.0008 inch thick and about 0.0012 inch wide together with a cup formed from about 32.5 mg. of 0.8-inch zirconium sheet foil about five-eighths of an inch square.

In the case of each of these two lamps, the bulb with the blue coating has a light output about 70 percent of that of the corresponding clear lamp. The peak brightness of the AG-1B is about 0.28 megalumen, for the blue focal-plane lamp it is about 0.15 megalumen. The clear AG-1 lamp has a peak light output of about 0.40 megalumen, and the clear focal-plane lamp has a peak output of about 0.22 megalumen. Since the shutter in a focal-plane camera is normally open during the time interval of about from 12 to 35 milliseconds (ms.) after triggering, it can be seen from FIG. 4 that the light output of the focal-plane lamp is rather close to constant in comparison with that of the AG-1 over the time interval required for the focal-plane shutter to operate.

Other types, sizes and configurations of photoflash bulbs than the all-glass AG-1 type can effectively utilize the present invention, but the all-glass type bulb has been used here for illustrative purposes. The advantages of the invention become most evident in photoflash lamps formed from glass tubing. According to the teachings of the prior art, such lamps would not be able to effectively use even hammered leaf foil due to the desirability for part of the foil to resiliently contact areas of the tubular wall to avoid excessive shifting and damage to the lamp. The wadded foil formerly used was mainly supported by point contacts rather than area contacts. This prevented shifting in bulbs whose walls were curvatures of revolution, but would not be as satisfactory in modern tubular bulbs.

The construction providing the sheet foil as a foil cup has the advantage of the cup holding any supplementary filamentary combustible material in place about the ignition means and preventing it from becoming accidentally entrapped in the tip upon sealing of the lamp. Any such filamentary material entrapped in the tipping seal could lead to leakage of oxygen out or air into the lamp thereby harming the light output and possibly leading to an explosion hazard. Although previous methods of construction of all-glass photoflash lamps have generally included compression of the filamentary combustible material to keep it away from the tip during the sealing, the present invention allows that manufacturing step to be omitted as a separate operation.

A sheet foil cup or band used with shredded foil will block some of the light output of the shredded foil but the absorbed energy will contribute to the ignition and burning of the foil. Therefore, if filamentary combustible material is used, it will be preferable to locate it substantially in closer proximity to the ignition means than is the sheet foil. Thus, the more readily ignitable material should be closer to the ignition means than is the less readily ignitable material.

Photoflash lamps of the invention can be produced by various processes. Except for the steps concerned with the sheet foil material, one useful process is described and claimed in patent application 91,279 filed February 23, 1961, Anderson et al., now Patent 3,188,162, issued June 8, 1965, and assigned to the assignee of the present invention, and other methods known in the art may be used. The process of Patent 3,188,162 includes the steps of sealing a lamp mount, comprising a pair of lead-in wires having a filament connected thereacross, into one end of a glass tube to form a sealed end thereon with the filament located a short distance inwardly of the glass tube from its sealed end, applying through the open other end of the glass tube a quantity of primer material onto the filament, introducing into the glass tube through its open end a quantity of combustible material, exhausting and introducing into the glass tube through its open end a combustion-supporting gaseous medium, and then heating and sealing off an intermediate portion of the glass tube between the open end and the combustible material.

In the usual processing scheme used, the combustible material must be compacted around the ignition means before tipping of the lamp to avoid catching bits of filamentary combustible material in the seal. According to the present invention, that manufacturing step need not be carried out separately since it can be accomplished by the operation of inserting the sheet foil in the form of a cup into the flash lamp and thereby compacting and restricting the filamentary combustible material, if any, to the vicinity of the ignition means opposite the end of the lamp to be tipped. Although the cup, band or other configuration of combustible sheet foil material may be made and inserted by different types of manufacturing processes, a specific process for manufacturing photoflash lamps of the invention is described and claimed in copending application Serial No. 452,190, Anderson, filed concurrently with the present application. In this copending application, a process is described in which the sheet foil cup is formed by pressing an oversize sheet foil blank into a thin walled tube. The thin walled tube is inserted into the lamp tube, and the cup is pushed out of the thin walled tube and into the lamp tube. Reference can be made to this copending application for a more detailed description of this process.

Plastic coatings known in the art may be used satisfactorily on lamps of the invention for purposes of safety. Commercial blue dyes can be used with such plastic coatings for color corrections desirable with various photographic color film.

Preferred parameters for focal-plane flash lamps of the invention of an all-glass type include the following: 6–7 mg. shredded zirconium foil, 30–35 mg. zirconium sheet foil in the shape of a cup or thimble over the top of shredded foil, and an oxygen filling of about 8 cc. measused at one atmosphere and 75° F. These parameters are for photoflash lamps having a volume of about 1.2 cc. or slightly larger and formed from glass tubing generally about 0.420–0.450 inch outside diameter with a wall thickness of about 0.027–0.035 inch. Upon testing, clear lamps of this type have been found to have average light output characteristics as follows:

| | |
|---|---|
| Time to ½ peak intensity, ms. | 8.5 |
| Time to peak intensity, ms. | 16.3 |
| Duration at ½ peak intensity, ms. | 29.1 |
| Peak intensity, megalumens | 0.20 |
| Total light output, lumen-seconds | 8,533 |

Approximate comparative results for standard AG-1 lamps are:

| | |
|---|---|
| Time to ½ peak intensity, ms. | 8 |
| Time to peak intensity, ms. | 12 |
| Duration at ½ peak intensity, ms. | 13 |
| Peak intensity, megalumens | 0.4 |
| Total light output, lumen-seconds | 7,200 |

In studying the versatility of zirconium sheet foil fillings in photoflash lamps, tests were made with foil having several different thicknesses. Results of this test are presented in Table I below. Each data point represents the average of the results of testing of five lamps. The sizes of the foil blanks were changed with the different thicknesses in each case to maintain approximately 30–34 mg. of foil in each lamp design. The volume of oxygen filling in each case was about 8.0 cc. at pressure atmospheric and 75° F.

TABLE I.—FOIL THICKNESS VARIATIONS

| Foil Thickness (mils) | Size of Foil Blank (inches) | Weight of Foil Blank (mg.) | Time to Peak Intensity (ms.) | Peak Intensity (megalumens) | Total Light Output (lumen-seconds) | Time to one-half Peak Intensity (ms.) | Duration at One-half Peak Intensity (ms.) |
|---|---|---|---|---|---|---|---|
| 0.2 | 1-¼ x 1-¼ | 33.8 | 9.2 | 0.42 | 7,938 | 6.6 | 12.5 |
| 0.3 | 1 x 1 | 30.5 | 11.8 | 0.30 | 8,128 | 8.0 | 16.3 |
| 0.4 | ⅞ x ⅞ | 33.5 | 15.6 | 0.24 | 8,706 | 9.9 | 25.5 |
| 0.5 | ¾ x ¾ | 30.7 | 16.4 | 0.20 | 8,390 | 11.2 | 31.8 |
| 0.6 | 11/16 x 11/16 | 31.1 | 24.4 | 0.15 | 7,752 | 15.0 | 39.2 |
| 0.8 | ⅝ x ⅝ | 33.1 | 32.4 | 0.10 | 6,778 | 19.6 | 48.8 |

It can be seen from results on lamps in which the foil at a thickness of about 0.2 mil (0.0002 inch) that this lamp design approximates the light output characteristics of a standard AG-1 photoflash lamp. This indicates that all sheet foil AG-1 type lamps may be feasible without the necessity of shredding any of the foil. The economics of production of thin foil in any certain time and place compared with the cost of shredding lower-priced thicker foil will affect the desirability of using one construction or the other.

The design of the preferred focal-plane lamps of an all-glass type can be described as follows. The lightweight load comprising the filamentary shredded zirconium foil is specified separately from the heavyweight load comprising zirconium sheet foil. The lightweight load can be made of about 6.4 mg. of 0.8-mil-thick zirconium shredded foil in the form of 36 cuts from 2-inch-wide foil or 18 cuts from 4-inch-wide foil (designated as Design No. 19). The heavyweight load can be a thimble folded from a ⅝ x ⅝-inch-square sheet of 0.8-mil-thick zirconium sheet foil having a weight of about 35.5 mg., and an oxygen fill of about 7.9 cc. at one atmosphere and 75° F. can be used.

Alternatively, the lightweight load could be in the form of 4.4 mg. of 0.5-mil shredded foil. This would be about 36 cuts from 2-inch-wide foil. With this lightweight load, the heavyweight load could be 23.0 mg. of 0.8-mil sheet foil ½ inch square (Design 22), 35.5 mg. of 0.8-mil sheet foil ⅝ inch square (Design 23), or 35.0 mg. of 0.5-mil-thick sheet foil ¾ inch square (Design 25), with the same amount of oxygen as above. The average light output characteristics of 10 samples of each of these preferred focal-plane lamp designs are presented in Table II below.

Also included in the table are data for two lamp designs using bands rather than cups of sheet foil. Both used 5.7 mg. of 0.8-mil shredded foil as 9 cuts of 4-inch-wide foil. Design 6 used 20.2 mg. of 0.5-mil sheet foil as a ¼ x 1¼-inch band with 6.0 cc. oxygen. Design 11 used 32.3 mils of 0.5-mil sheet foil as a ¼ x 2-inch band with 8.1 cc. oxygen. For certain purposes, Design No. 10 seems to be preferable.

While specific examples have been given of photoflash lamps of the invention, it will be understood that various changes, omissions and substitutions may be made within the true spirit and scope of the invention as defined in the appended claims.

What I claim as new and desire to secure by Letters Patent of the United States is:

1. A flash lamp comprising a sealed bulb consisting of a short length of glass tubing of substantially uniform wall thickness throughout and sealed at each end, a filling of a combustion-supporting gas in said bulb at a pressure of at least several atmospheres, a quantity of combustible sheet foil material located within said bulb and consisting essentially of material selected from the group consisting of zirconium, thorium, hafnium and combinations thereof, said foil material having a configuration and dimensions at least great enough so that the foil resiliently contacts the bulb wall tending to hold the foil in position, and ignition means at one end of said bulb for igniting said combustible material, and a quantity of combustible filamentary strand material loosely distributed within said bulb and being substantially closer in proximity to said ignition means than is said foil material, said filamentary strand material consisting essentially of materials selected from the group consisting of zirconium, thorium, hafnium and combinations thereof, and said lamp generating a total light output per unit bulb volume of at least 3,000 lumen-seconds per cc.

2. A flash lamp according to claim 1 in which said foil material comprises a segment of circular configuration.

3. A flash lamp according to claim 1 in which said foil material is folded to the general configuration of a cup with its open end facing the ignition means.

4. A flash lamp comprising a sealed bulb consisting of a short length of glass tubing of substantially uniform wall thickness throughout and having an external stem press portion extending from and closing one end thereof, the other end of said length of glass tubing being closed by an end wall portion terminating in an exhaust tip, said bulb having an internal volume of less than about 2 cc., a filling of a combination-supporting gas in said bulb at a pressure of at least approximately five atmospheres, a quantity of combustible sheet foil material located within said bulb and consisting essentially of zirconium, said foil material having a thickness and a configuration and dimensions at least great enough so that the sheet foil resiliently contacts an area of the bulb wall tending to hold the foil in position, and ignition means in said bulb for igniting said combustible material and

TABLE II.—FOCAL-PLANE LAMP DESIGNS

| Designated Design No. | Time to Peak Intensity (ms.) | Peak Intensity (megalumens) | Total Light Output (lumen-seconds) | Time to One-half Peak Intensity (ms.) | Duration at One-half Peak Intensity (ms.) |
|---|---|---|---|---|---|
| 19 | 16.2 | 0.19 | 7,803 | 10.2 | 27.3 |
| 22 | 16.4 | 0.16 | 7,297 | 9.5 | 40.0 |
| 23 | 20.0 | 0.16 | 7,762 | 11.3 | 41.9 |
| 25 | 18.8 | 0.20 | 7,934 | 11.7 | 31.1 |
| 6 | 18.7 | 0.15 | 5,393 | 12.3 | 28.3 |
| 11 | 21.0 | 0.14 | 5,908 | 13.7 | 33.7 | comprising a pair of lead-in wires sealed through said stem press, and a quantity of combustible filamentary strand material loosely distributed within said bulb and being substantially closer in proximity to said ignition means than is said foil material, said filamentary strand material consisting essentially of zirconium, said lamp generating a total light output per unit bulb volume of at least 3,000 lumen-seconds per cc.

5. A flash lamp according to claim 4 in which said foil material is folded to the general configuration of a cup with its open end facing the ignition means.

6. A flash lamp comprising a sealed bulb consisting of a short length of glass tubing of substantially uniform wall thickness throughout and having an external stem press portion extending from and closing one end thereof, ignition means in said bulb for igniting said combustible material and comprising a pair of lead-in wires sealed through said stem press, the other end of said length of glass tubing being closed by an end wall portion terminating in an exhaust tip, said bulb having an internal volume of approximately 1.2 cc., a filling of oxygen in said bulb at a pressure of at least approximately five atmospheres, a quantity of combustible sheet foil material in said bulb consisting of zirconium foil formed to the general configuration of a cup having its open end facing said ignition means, said foil material having a thickness of about 0.0008 inch and being folded into the general configuration of a cup, the sides of the cup contacting resiliently an area of the inner surface of the bulb to aid in holding the foil generally in position, the quantity of said foil being about 30–35 mg., and a quantity of combustible filamentary material in said bulb consisting of fine cut strands of zirconium foil loosely distributed within said bulb but in substantially closer proximity to said ignition means than is said foil, the quantity of filamentary combustible material in said bulb amounting to around 6–7 mg., said lamp generating a total light output per unit bulb volume of at least approximately 3,000 lumen-seconds per cc.

References Cited by the Examiner
UNITED STATES PATENTS

| 2,057,583 | 10/1936 | Mey | 67—31 |
| 3,238,216 | 1/1966 | Desaulniers et al. | 67—31 |
| 3,263,457 | 8/1966 | Reiber | 67—31 |

References Cited by the Applicant
UNITED STATES PATENTS 2,497,517  2/1950  Pipkin.

JAMES W. WESTHAVER, *Primary Examiner.*